Aug. 22, 1933.  F. NALLINGER  1,923,498

AIR PURIFIER

Filed May 10, 1930

Inventor

Patented Aug. 22, 1933

1,923,498

UNITED STATES PATENT OFFICE 1,923,498

AIR PURIFIER

Fritz Nallinger, Stuttgart-Unterturkheim, Germany, assignor to Daimler-Benz Aktiengesellschaft, Stuttgart-Unterturkheim, a Company of Germany Application May 10, 1930, Serial No. 451,393, and in Germany May 17, 1929

1 Claim. (Cl. 183—90)

In internal combustion engines, more particularly for power driven vehicles, in order to prevent sand and dust from entering the engine with the air for the mixture, an air purifier which separates the foreign bodies from the air is attached to the inlet tube of the carburettor. Air purifiers are generally used which consist of a cylindrical housing with screw-like inlet channels. The channels give the air in the housing a circulating motion, whereby the sand and dust present in the air are flung against the wall of the housing and pass out through a slit in the wall.

In spite of this advantage, such air purifiers have the disadvantage that an unpleasant noise is caused when the air is sucked in.

This disadvantage is avoided, according to the invention, by providing the air purifier with an antechamber into which the air flows through a nozzle. It is preferable to let the nozzle open tangentially into the antechamber so that the air is given a circulating motion in the latter.

In the accompanying drawing a constructional form of the invention is illustrated diagrammatically and by way of example.

Figure 1:
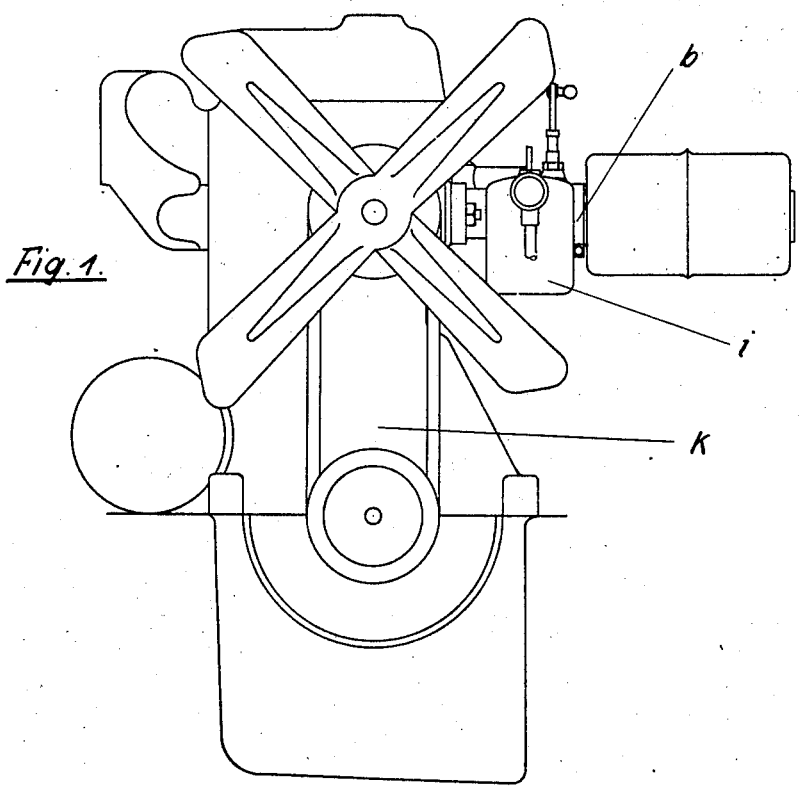
Figure 1 shows the arrangement of the air purifier on the motor.
Figure 2:
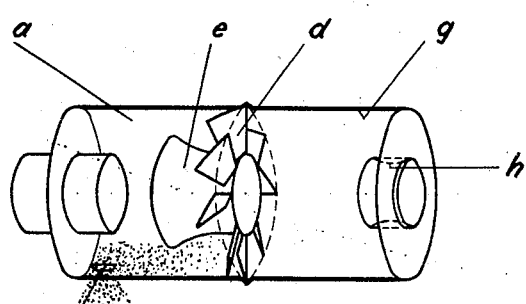
Figure 2 shows an air purifier in elevation, with the front of the cylindrical housing removed.
Figure 3:
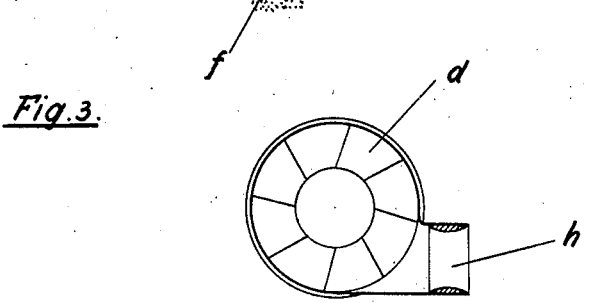
Figure 3 shows an air purifier, with a nozzle opening tangentially into it, in a section perpendicular to the axis of the air purifier.

The air purifier $a$ is for instance fixed to the carburettor $i$ of the motor $k$ by a pipe clip $b$. An air purifier is shown which consists of a cylindrical housing, in which, on the inlet side, a number of screw shaped channels $d$ are arranged round a conical frustrum $e$, which flares towards the inside. In the housing of the air purifier, the air acquires a circulating motion on account of the channels, whereby the heavy matter present in the air is thrown outwards and escapes for example through the slit $f$. A cylindrical antechamber $g$, in which a nozzle $h$ of the Venturi type for the entry of the air is set, is attached to the air purifier $a$. The interior of the nozzle $h$ diverges towards the ends from a point intermediate the ends with a gradual transition from the points of smaller cross-section to the points of greater cross-section, as shown in Figures 2 and 3. The nozzle is preferably attached tangentially to the ante-chamber, whereby the air takes on a circulating motion, even before it comes into the air purifier. Through this simple arrangement a noiseless suction of air into the air purifier is attained.

Moreover, in the arrangement according to the invention, the foreign bodies are more fully separated by the air purifier, because the velocity of the circulating motion in the air purifier, and consequently the centrifugal action are increased by the circulating motion in the ante-chamber due to the tangential entry of the air.

What I claim is:

An air purifier for the carburettor of an internal combustion engine, comprising in combination an air purifying chamber having an outlet in communication with the carburettor, a conical frustrum extending into the chamber at the end thereof remote from the outlet and flaring towards the inside, the air purifying chamber also having a plurality of screw-shaped inlet channels extending round said conical frustrum, an antechamber in open communication through said inlet channels with the air-purifying chamber and an air inlet nozzle for admitting air to said antechamber, said nozzle comprising a tube of the Venturi type.

FRITZ NALLINGER.